Nov. 9, 1954    O. W. SWARTZENDRUBER    2,693,672
ROTARY REEL TYPE GRASS CUTTER
Filed Sept. 24, 1952
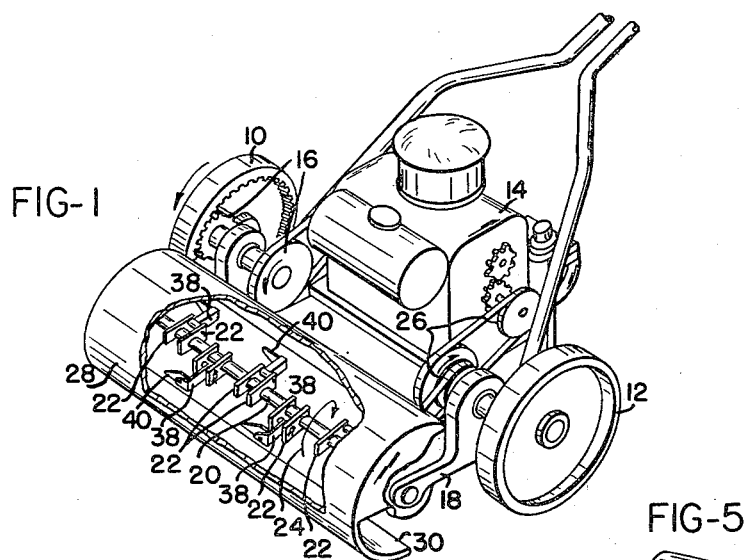
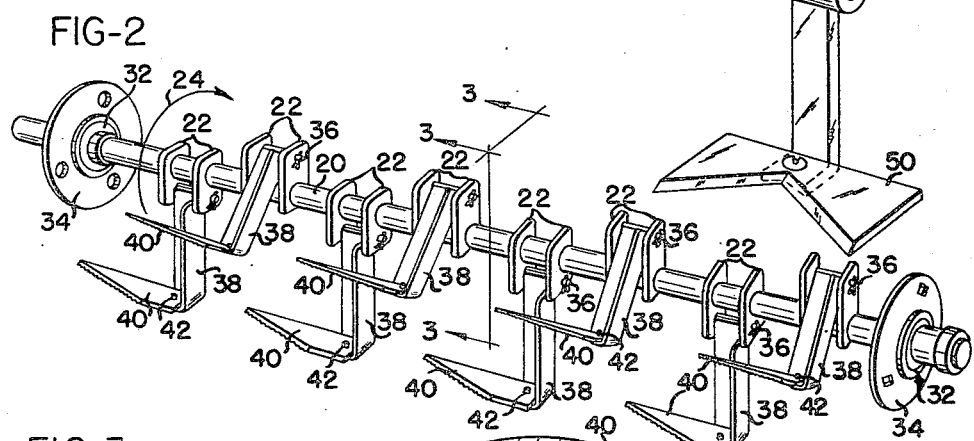
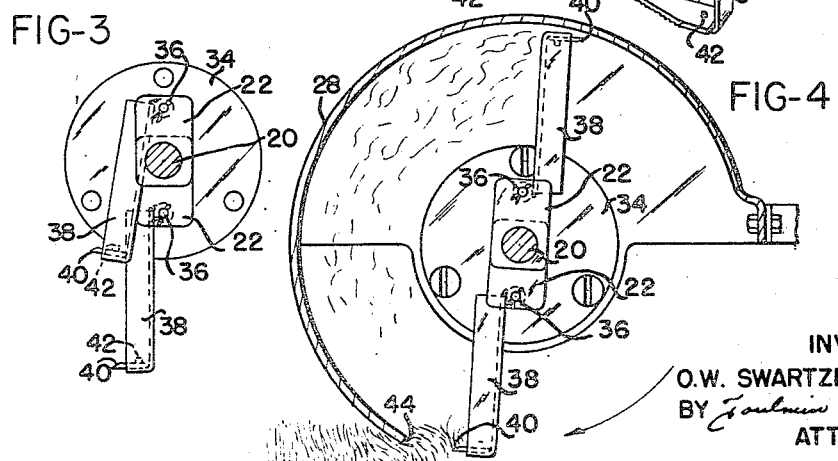
INVENTOR
O.W. SWARTZENDRUBER
BY
ATTORNEYS

United States Patent Office 2,693,672
Patented Nov. 9, 1954

2,693,672

ROTARY REEL TYPE GRASS CUTTER

Omar W. Swartzendruber, New Carlisle, Ohio

Application September 24, 1952, Serial No. 311,203

3 Claims. (Cl. 56—26)

This invention relates to an apparatus for mowing, particularly such an apparatus including a rotary reel and particularly adapted for cutting grass and similar growths.

The conventional mower for grasses such as are employed for mowing lawns and the like generally comprise a rotary reel which cooperates with a fixed cutting blade to accomplish the desired mowing or shearing operation. Devices of this nature require that the mowing blade be kept sharp and in an accurately adjusted position if proper results are to obtain. These requirements are so critical that a mower of this nature is readily rendered defective in operation if it strikes a stone or a sizable twig or the like during an operation.

A further fault to be found with conventional mowers of the nature referred to above is that it is not easy to replace one of the rotary cutting blades on the reel or the stationary cutting blade and, ordinarily, when one of these members is damaged beyond repair the mower is discarded.

Having the foregoing in mind, it is the particular object of this present invention to provide a mower mechanism and, in particular, a reel for a mowing mechanism, which will avoid the drawbacks referred to above that attach to a conventional mowing machine. A particular object of this invention is the provision of a mower, which eliminates the conventional stationary cutting bar.

A still further object is the provision of a mowing device which is not subject to being severely damaged on account of striking stones, twigs, or other obstructions.

Another object of this invention is the provision of a mowing device in which the cutting element of the device can easily be maintained in efficient condition and even entirely replaced at a minimum of expense.

It is also an object of this invention to provide a mowing arrangement in which there is little or no tendency for articles such as stones or pieces of wood to be thrown out by the mower with the possibility of injury to anyone in the immediate vicinity of the mower.

Having the foregoing in mind, the objects of this invention are attained, in brief, by providing power mower of the type used on lawns with the reel having mounted therealong a plurality of swinging arms with the outer end of each arm carrying a detachable cutting element. The reel is shrouded by a cover that prevents anyone from being injured by the reel while it is being driven and this cover is positioned so that its lower edge will bend the grass and other growth downwardly in front of the reel which will place the said grass and growth in ideal position for being neatly sheared by the cutting elements of the reel.

The several objects referred to above as well as still other objects and advantages of this invention will become more apparent upon reference to the specification taken in connection with the accompanying drawings in which:

Figure 1 is a perspective view of a mower having a cutting reel according to my invention shown in perspective and with a portion of the cover about the reel broken away;

Figure 2 is a perspective view of the reel drawn at larger scale than Figure 1;

Figure 3 is a transverse section indicated by cutting plane 3—3—3 on Figure 2;

Figure 4 is an enlarged transverse sectional view showing the mower in operation; and Figure 5 is an enlarged perspective view showing a modified form which a cutting element according to this invention can take.

Referring to the drawings somewhat more in detail, Figure 1 shows a power mower arrangement having ground wheels 10 and 12 mounted on shafts carried by the frame of the machine and which frame also supports the drive motor 14. A belted and geared connection at 16 drivingly connects motor 14 with one or both of the ground wheels for driving the mower across the ground if so desired.

Mounted at the front end of the mower frame as by the arm means 18 is a mower reel comprising a shaft 20 which carries a plurality of bracket members 22 successive of which are arranged in respectively opposite directions on the said shaft.

The shaft 20 is adapted for being driven in the direction indicated by arrow 24 by a belt connection 26 leading from the reel to the motor 14. The reel is shrouded by a cover member 28 mounted on the front end of the mower frame and by opening along the bottom as indicated at 30.

The structure of the reel, and which forms the principal feature of the present invention, will be more clearly seen in Figures 2, 3, and 4 where it will be observed that at the opposite ends of shaft 20 there are provided bearings 32, preferably anti-friction bearings, and associated with which are the mounting plates 34.

It will also be seen in these figures that each of the brackets 22 comprises a pair of spaced plates affixed to shaft 20 by welding or brazing and detachably receiving a pivot pin 36 extending parallel with the axis of shaft 20. On each pivot pin 36 there is mounted a swinging arm 38, which may be in the form of an angle in cross-section and at the outer end of which there is mounted a sharpened cutting element 40. The arm 38 may advantageously have its outer end closed as by bending under one web thereon and the web will serve for receiving the rivet or screw 42 by means of which the cutting element 40 is securely, but detachably fastened.

Reference to Figures 2 and 3 will indicate that the several arms 38 are freely swingable about their supporting pivot pins 36 but come to rest in a stopped position such that the cutting element on the end of each arm cannot be brought into direct engagement with the next adjacent arm in normal operation.

When the reel is rotating at its operating speed as it is illustrated in Figure 4 the arms 38 are thrown outwardly by centrifugal force in the manner of swing hammers with the reel rotating in the direction indicated by the arrow in Figure 4, the cutting elements 40 operating to shear the grass in neat and efficient manner. At this time the lower edge 44 of the cover 28 operates to bend the grass down in front of the cutting elements thereby to put the grass in an ideal condition for being efficiently sheared off.

It will be appreciated that each cutting element 40 is of a greater length in the direction of the axis of shaft 20 than the center to center distance between adjacent brackets 22 so that when mowing is taking place, the entire width of the path along which the mower moves will be cut in a uniform manner.

The cutting elements as they are illustrated in Figures 1 through 4 represent only one form which this part of my invention can take and it is also contemplated to utilize other shapes such as the one illustrated at 50 in Figure 5. The cutting member in Figure 5 is a swinging arm but the sharpened cutting element at 50 on the outer end of the arm is in the form of a plate having its leading edge sharpened and in the form of a V.

In the use of a mower according to my invention, should the swinging arms strike an obstruction, they will readily yield backwardly so that no serious harm will result. If the obstruction is small enough to be driven then, instead of it being thrown forwardly of the mower it will be thrown about inside of the cover over the reel and thus the operation of the mower does not create any hazard on account of flying articles.

By having the cutting elements small and detachably mounted in the manner described that can be sold quite cheaply and readily replaced any time it becomes necessary. The entire assembly of the cutting element and pivoted arm is likewise inexpensive and an entire extra set of the cutting members could be kept on hand without involving any considerable investment.

It will be understood that what has been illustrated and described is only exemplary of the many forms which this invention can take and will therefore be understood that it is desired to comprehend within this invention such changes and modifications therein as may be necessary to adapt it to particular circumstances and which may be considered to come within the scope of the appended claims.

I claim:

1. A mowing device having a frame comprising; a shaft extending transversely to the direction of a movement of the mower and journaled at its ends in said frame, means for driving said shaft in rotation so that the bottom thereof is moving in the same direction as said mower, a plurality of brackets spaced along said shaft, swinging arms pivotally mounted on said brackets, cutting elements mounted on the outer ends of said arms having their cutting edges at an angle to the axis of said shaft, and a cylindrical cover extending about said shaft and the arms thereon just outside the path of said cutting elements and having a transverse opening at the bottom, the front edge of said opening being only slightly higher than the lowest level reached by said cutting elements.

2. The combination in a power mower, of a power driven reel comprising; a transverse shaft having a plurality of radial arms distributed therealong and pivoted to the shaft on pivot pins extending at the same angle as the axis of said shaft, each said arm having a cutting element on its outer end with a cutting edge extending at an acute angle to the axis of said shaft, and a cover surrounding said shaft and the said swinging arms thereon and having a transverse opening along the bottom, said shaft being driven in such a direction that the arms below the shaft are moving in the same direction as the mower, the edge of said cover along the front of said opening being just outside the path of said cutting elements and at a level only slightly above the lowermost level reached by said cutting elements thereby to bend vegetation over just prior to the cutting thereof.

3. The combination in a power mower, of a power driven reel comprising; a transverse shaft having a plurality of radial arms distributed therealong and pivoted to the shaft on pivot pins extending at the same angle as the axis of said shaft, each said arm having a cutting element on its outer end with a cutting edge extending at an acute angle to the axis of said shaft, and a cover surrounding said shaft and the said swinging arms thereon and having a transverse opening along the bottom, said shaft being driven in such a direction that the arms below the shaft are moving in the same direction as the mower, said cutting elements each being of such a length that the said elements overlap in the axial direction of said shaft, the edge of said cover along the front of said opening being only slightly higher than the lowermost level reached by said cutting elements so as to bend the vegetation being cut over just prior to the cutting thereof.

References Cited in the file of this patent

UNITED STATES PATENTS

| Number | Name | Date |
| --- | --- | --- |
| Re. 14,886 | Campbell | June 22, 1920 |
| 1,893,871 | Romera | Jan. 10, 1930 |
| 2,479,937 | Knowles | Aug. 23, 1949 |
| 2,506,054 | Agee et al. | May 2, 1950 |
| 2,509,343 | Henderson | May 30, 1950 |